April 28, 1953     J. A. PERKON     2,636,233
MOLDING MACHINE
Filed Sept. 2, 1949     2 SHEETS—SHEET 1
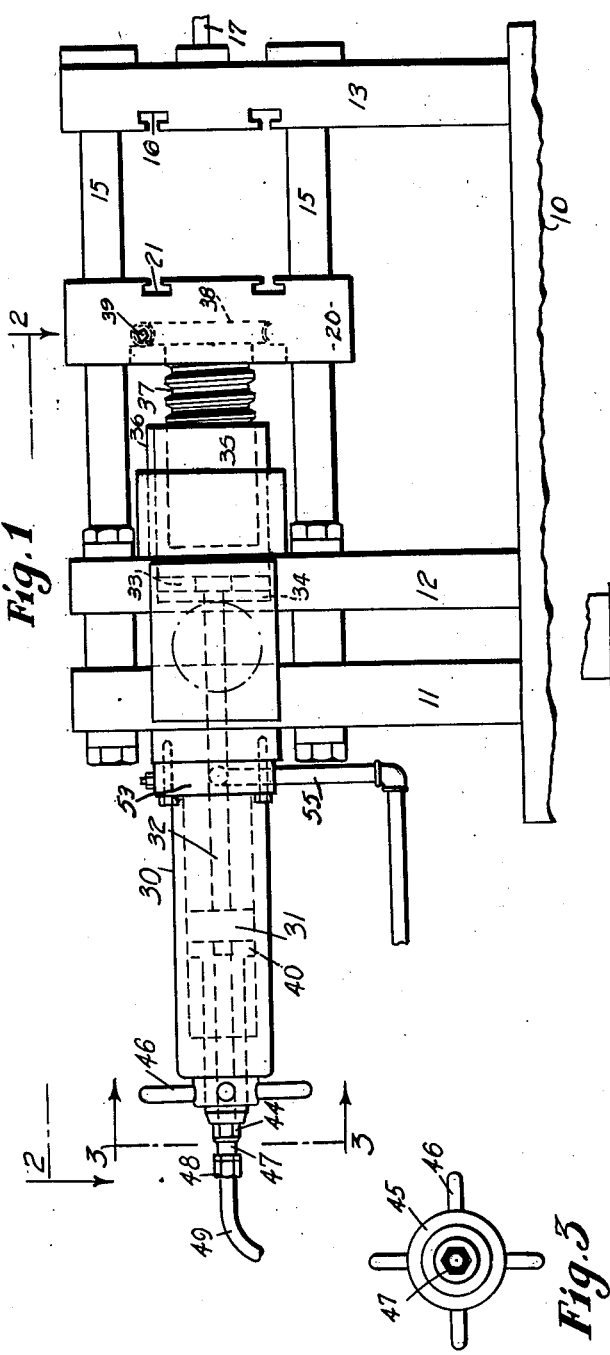
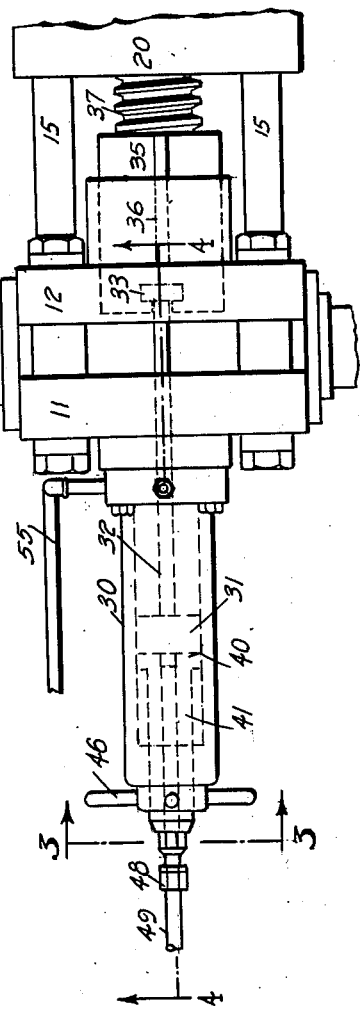
INVENTOR.
JOHN A. PERKON
BY
Bates, Teare & McBean
Attorneys April 28, 1953     J. A. PERKON     2,636,233
MOLDING MACHINE
Filed Sept. 2, 1949     2 SHEETS—SHEET 2
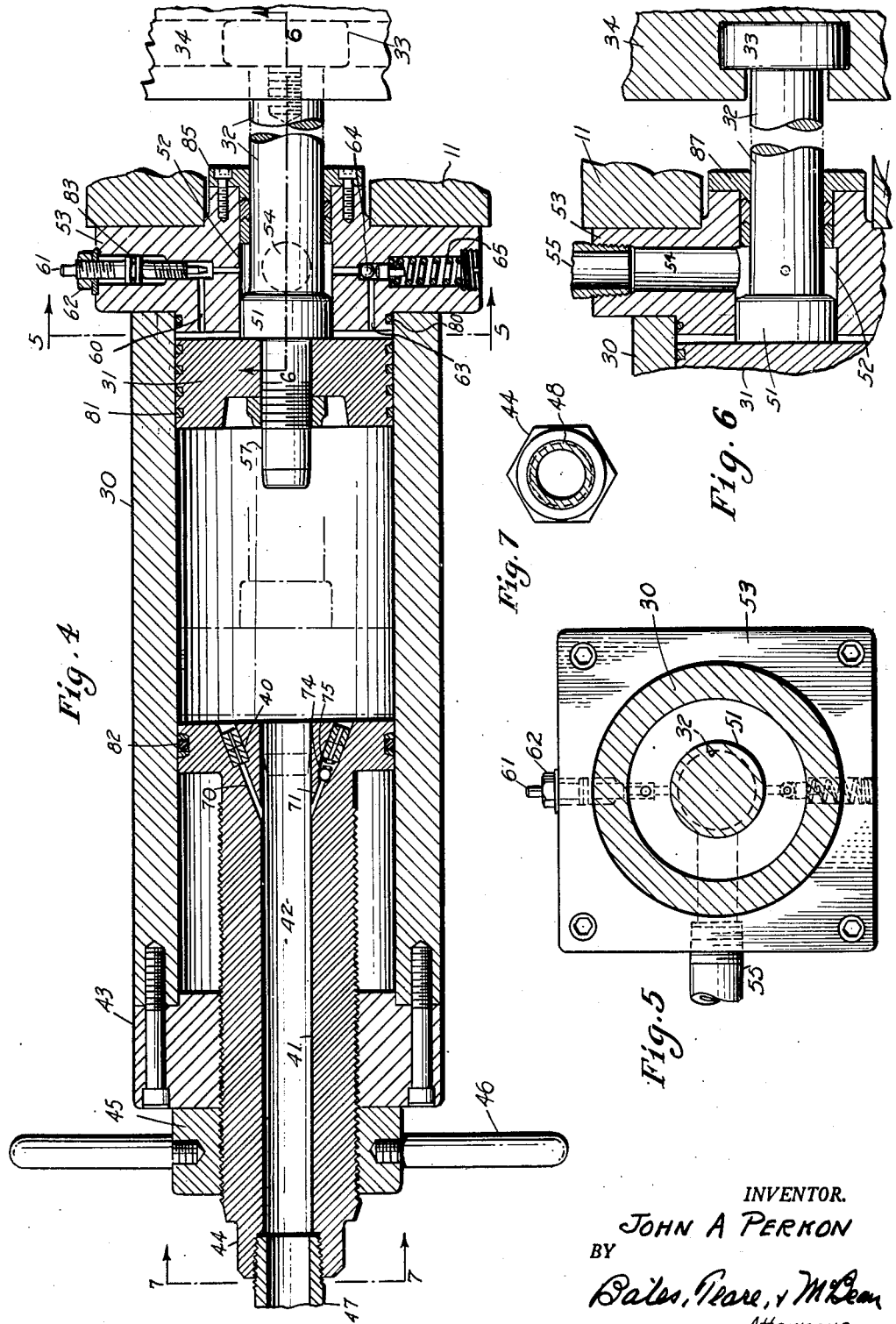
INVENTOR.
JOHN A PERKON
BY
Bates, Teare, & McKean
Attorneys Patented Apr. 28, 1953

2,636,233

UNITED STATES PATENT OFFICE 2,636,233

MOLDING MACHINE

John A. Perkon, Cleveland, Ohio, assignor to Cuyahoga Industries, Cleveland, Ohio, a corporation of Ohio Application September 2, 1949, Serial No. 113,870

3 Claims. (Cl. 22—92)

This invention relates to a molding machine of the type having a reciprocating device operated by hydraulic pressure and serving to position a movable die with reference to its mate.

One of the objects of the invention is to provide means to adjust the stroke of the hydraulically actuated piston so that unnecessary idle movement thereof may be avoided. The dies employed in molding machines vary greatly as to thickness and amount of projection of one into the other, and a machine to be adapted for various dies must have a maximum stroke sufficient for the maximum die shifting. However, when a smaller die is used such maximum stroke by the reciprocating device entails a very considerable waste of time. My invention provides readily operable means for reducing this maximum stroke as permitted by the dies then used.

Another object of the invention is to provide means for cushioning the die operating piston adjacent the ends of its stroke so that it may start and terminate its movement gradually, and thus avoid strains on the machine or possible injury to the dies.

An embodiment having the above noted advantageous features is illustrated in the drawings hereof and is hereinafter fully described.

In the drawings, Fig. 1 is a side elevation of a molding machine embodying my invention; Fig. 2 is a partial plan of such machine (the portion of the machine appearing in Fig. 2 being indicated by the line 2—2 on Fig. 1); Fig. 3 is a detail in vertical section, as indicated by the line 3—3 on Fig. 1; Fig. 4 is an axial section of the hydraulic mechanism, as indicated by the line 4—4 on Fig. 2 but on a larger scale; Fig. 5 is a cross section in the plane indicated by the line 5—5 on Fig. 4; Fig. 6 is a partial horizontal section in the plane indicated by the line 6—6 on Fig. 4; and Fig. 7 is a detail in vertical section, indicated by the line 7—7 on Fig. 4.

In Fig. 1, I have indicated a suitable base 10 carrying three spaced upright frame members 11, 12 and 13. Four horizontal rods 15 (spaced at the four corners of a theoretic transverse square) rigidly connect the three frame members. The end upright frame member 13 is provided with means, indicated by T-slots 16, for holding the fixed die, not shown, and with a suitable conduit 17 for feeding of molten metal or other material under pressure through the fixed die to the molding cavity thereof.

Slidably mounted on the frame rods 15 is a movable cross head 20 which carries the mating die, not shown, but adapted to be fastened to the cross head by means indicated by the T-slots 21. The cross head is moved toward and from the fixed die by the mechanism of this invention, which has a stationary hydraulic cylinder 30 mounted on the standard 11 and having within it a piston 31 operating a piston rod 32 which is connected to the cross head 20.

The piston rod may be attached directly to the cross head, but I prefer to introduce an intermediate adjustment. Thus, I have shown the rod 32 carrying a head 33 mounted in an end wall 34 of a cylindrical block 35 slidably mounted in the standard 12. The block 35, with its rotation prevented by a spline 36, carries an internal thread (not shown) into which extends a screw 37 rotatably carried by the cross head.

Within the cross head 20, and tight on the screw 37, is a worm wheel 38 (shown in dotted lines in Fig. 1) meshed with a worm 39 having an angular external head by which it may be turned. This adjustment enables the parts to be re-positioned for different dies so that the piston may be substantially at the end of the cylinder when the dies are closed.

To operate the piston 31 with a stroke adjustable in length according to the dies used, I provide a movable head for the other end of the cylinder. As shown in Fig. 4, this movable head 40 is within the cylinder and has a tubular shank 41, the bore 42 of which extends entirely through the shank and head. The shank has an external thread mounted in an internal thread in a stationary head 43 at the end of the cylinder 30. The tubular shank 41 is provided wtih an angular external portion 44 (see Fig. 7) by which the shank and head 40 may be rotated in the cylinder, thus causing the head 40 to approach or recede from the movable piston 30.

To lock the tubular extension 41 in its selected position, I provide on its exterior a jamb nut 45 which is threadedly mounted on the tubular extension and abuts the stationary head 43. Suitable radial arms 46 enable the jamb nut to be loosened or tightened manually as desired. Threaded into the end of the tubular shank 41 is a conduit 47 which has a swivel connection 48 (Figs. 1 and 2) with the supply pipe 49 for fluid under pressure.

It will be seen that the application of a wrench or other tool to the angular portion of the shank enables the shank and head 40 to be rotated as desired, and thus caused to reduce or enlarge the available pressure space between the head 40 and the movable piston 31. When the movable head 40 has been set to provide an available, but not excessive, space for movement of the piston 31 according to the size of the dies and is locked, the operation proceeds with fluid in the cylinder space between the now stationary head 40 and the movable piston 31. Pressure fluid for this operation is admitted through the conduit 49 and the bore of the tubular shank 41. Such pressure shifts the piston 31 from the broken line position shown in Fig. 4 towards the right into some such position as shown in full lines, to bring the movable die into co-action with the fixed die and hold it in this position during the casting operation.

I have referred to the fact that the cushioning of the stroke at each end of the operation is one of the features of this invention. To effect this, as the active stroke of the piston is coming to its termination, shown in Fig. 4, I provide an annular enlargement 51 on the piston rod 32, this enlargement being adapted to enter the cylindrical space 52 in the stationary cylinder head 53 carried by the standard 11. A passageway 54 leads from the space 52 to a conduit 55 which may supply or carry away the pressure fluid.

When the annular enlargement 51 enters the cylindrical space 52, the direct exit from the cylinder into that space is prevented and the only escape for fluid from the cylinder is by a narrow by-pass 60 leading from the cylinder into the space 52. This passageway is regulated by a needle valve 61 having an angular external head by which it may be turned and provided with a jamb nut 62 for locking it in position. This choking mechanism provided for the cushioning of the piston as it comes to the position shown in Fig. 4.

When the return stroke of the piston, that is, towards the left in Fig. 4, starts, by pressure admitted to the cylindrical space 52, this pressure acts on the enlargement 51 and through the passageway 60 on the piston itself. It is desirable that the starting action have the greater passage space for the pressure fluid than in the stopping action, and to this end I provide another passageway in the head 53 leading from the space 52 to the cylinder space. This passageway designated 63 is controlled by a check valve comprising a ball 64 pressed to its seat by a spring 65. When the return stroke starts, pressure is accordingly admitted to the cylinder through both the pasageways 60 and 63, the pressure unseating the check valve. Then, after the enlargement 51 clears the cylinder space 52, the maximum pressure is exerted on the entire piston surface.

To cushion the return stroke, I provide the piston with a central projection 57 (which may be an extension of the piston rod 32), and this projection, toward the end of the stroke, slides into the bore 42 of the tubular shank 41 and chokes the direct escape of pressure fluid. The only escape is provided by means of a reduced passageway 70, and thus the piston is gradually brought to rest.

When the piston again starts in the active in the direction to close the dies, pressure through the bore 42 acts on the end of the plunger 57 and directly on the piston through the open passageway 70 and also through an additional passageway 71 which has been closed by a check valve ball 74 pressed by a spring 75. The pressure unseats this valve and thus pressure fluid reaches the piston directly through the two passageways 70 and 71. The extra passageway controlled by the check valve allows a greater flow of fluid in starting the piston from its position of rest than in checking the movement to that position, similar to that already described for the other end of the stroke.

It will be understood that I have provided suitable packing to prevent leakage of pressure fluid in various locations. Thus, there is packing 80 between the cylinder 30 and its end 53; packing 81 on the piston; packing 82 on the head 40, and packing 83 about the needle valve. Such packing may in each case consist of an elastic toroidal ring mounted loosely in a groove. I also provide a stuffing box 85 about the piston rod.

It will be seen that I have provided simple means for adusting the available length of the cylinder and thereby regulating the stroke of the piston according to the space required by the die. This adjustment is very readily operable from the exterior, without changing any of the other parts of the mechanism, and when adjusted the newly positioned internal head is effectively locked in its selected position.

It will also be seen that by my arrangement of choking the discharge passageways at the ends of the stroke I gradually reduce the space available for discharge of the released liquid and, hence, gradually bring the movable piston to a stop at the end of its stroke. The projections entering the respective exit orifices cause a main reduction to the escape of the fluid while the reduced passageways allow the remaining fluid to escape very gradually. Furthermore, by reason of the two escape passageways at each end, one of them having a check valve to provide a greater reduction in the escape passage at the end of the stroke than in the corresponding admission passage at the beginning of the subsequent stroke, I am able to obtain the desired quick start of the piston from a position of rest.

I claim:

1. In a molding machine, the combination of means for carrying a movable die, a cylinder, a stationary head at one end of the cylinder, a movable head in the cylinder, said movable head having a tubular shank the bore of which communicates with the interior of the cylinder, a piston in the cylinder, a piston rod leading from the piston through said stationary head and connected to the movable die, means for supplying pressure fluid to the space between said heads via the tubular shank of the movable head, a projection movable with the piston adapted to enter the end of the bore in the movable head, said movable head having a pair of by-passes spaced radially from each other about the entrance portion of the bore, one of said by-passes being normally open and the other by-pass having means blocking egress of fluid pressure from the cylinder while permitting ingress of fluid pressure from the tubular shank.

2. In a mechanism for operating a movable die in a molding machine, the combination of a cylinder, a piston in the cylinder, a movable cross head adapted to carry a die, an adjustable connection between the cross head and piston to enable the piston to be near the end of its stroke when the dies are closed, a movable head in the cylinder defining the effective end of the stroke of the piston, a tubular shank extending outwardly from said movable head, the bore of the shank communicating with the interior of the cylinder, means for cushioning the movement of the piston as it comes to the end of its stroke comprising a projection on the piston adapted to enter said bore, said tubular shank having a pair of by-passes spaced radially from each other around the portion of said bore adapted to be occupied by said projection, one of said by-passes being normally open and the other by-pass having means blocking egress of fluid pressure from the cylinder while permitting ingress of fluid pressure from the tubular shank.

3. In a molding machine, the combination of means for carrying a movable die, a cylinder, heads at the opposite ends of the cylinder, a piston within the cylinder, a piston rod leading from the piston axially outward through one of the heads and connected at its outer end with the movable die, said one head provided with an enlarged space about the piston rod and forming, a passageway from the cylinder, a conduit communicating with said enlarged space, an enlargement on the piston rod adjacent the piston adapted to enter the annular space to choke the passageway between said enlarged space and the cylinder, said one head provided with another reduced passageway between the annular space and the cylinder, and a valve operable from the exterior to control said latter passageway.

JOHN A. PERKON.

References Cited in the file of this patent

UNITED STATES PATENTS

| Number | Name | Date |
|---|---|---|
| 714,269 | Walton | Nov. 25, 1902 |
| 1,504,455 | Udale | Aug. 12, 1924 |
| 1,686,109 | Stuckey | Oct. 2, 1928 |
| 1,931,489 | During | Oct. 24, 1933 |
| 1,961,942 | Pack | June 5, 1934 |
| 1,989,812 | Lester | Feb. 5, 1935 |
| 2,112,342 | Lester | Mar. 29, 1938 |
| 2,268,949 | Lehmann | Jan. 6, 1942 |
| 2,358,686 | Caron | Sept. 19, 1944 |
| 2,493,602 | Sterrett | Jan. 3, 1950 |
| 2,494,071 | Veale | Jan. 10, 1950 |